United States Patent [19]
Tomita et al.

[11] 4,408,933
[45] Oct. 11, 1983

[54] CONTACT DETECTING APPARATUS

[75] Inventors: Tamaki Tomita, Okazaki; Hisaji Nakao, Toyota; Hideo Nishimura, Aichi; Kunihiko Eto, Toyota; Haruo Ohmura, Aichi, all of Japan

[73] Assignee: Toyoda Koki Kabushiki Kaisha, Kariya, Japan

[21] Appl. No.: 356,818

[22] Filed: Mar. 10, 1981

[30] Foreign Application Priority Data

Mar. 10, 1981 [JP] Japan .................................. 56/34197

[51] Int. Cl.$^3$ ..................... B23B 39/04; G01R 31/02; G08B 21/00
[52] U.S. Cl. ......................................... 408/8; 324/51; 340/644
[58] Field of Search ................... 340/652, 644; 408/8; 200/61.42; 324/51

[56] References Cited

U.S. PATENT DOCUMENTS 4,203,691 5/1980 Nishimura et al. ..................... 408/8

FOREIGN PATENT DOCUMENTS 148848 6/1961 U.S.S.R. ................................. 324/51
591897 1/1978 U.S.S.R. ................................. 340/644

Primary Examiner—Stanley T. Krawczewicz
Assistant Examiner—Jose M. Solis
Attorney, Agent, or Firm—Oblon, Fisher, Spivak, McClelland & Maier

[57] ABSTRACT

A contact detecting apparatus for detecting the contact of a workpiece with a tool in a machine tool which includes a magnetic coil mounted on the periphery of a spindle head and connected to an AC power source for generating an induced current in a looped secondary circuit including the workpiece, a work table, a machine body, a spindle head, a tool spindle and the tool, when the workpiece and the tool are moved relatively into contact with each other. A first conductive wire forming a secondary winding of one turn is arranged in a parallel relationship with the looped secondary circuit and a current induced therein by energization of the magnetic coil. A second conductive wire is connected at one end thereof to the looped secondary circuit. A detecting device is connected to the first and second conductive wires for detecting contact between the workpiece and the tool based on the voltage induced across the first and second conductive wires.

4 Claims, 2 Drawing Figures

CONTACT DETECTING APPARATUS

BACKGROUND OF THE INVENTION

1. Field of the Invention:

The present invention relates to a contact detecting apparatus for detecting the contact of a tool with a workpiece when they are moved relatively to one another.

2. Description of the Prior Art:

A conventional contact detecting apparatus is provided with a coil mounted on the end of a spindle head in which a spindle is rotatably received. This coil is connected to an AC power source to be energized, so that the coil generates loops of magnetic flux surrounding the spindle which induces current in an axial direction of the spindle. When a tool does not contact a workpiece, a looped secondary circuit connecting the spindle and a machine body is not completed, whereby there is no induced current. On the other hand, when the tool contacts the workpiece, the looped secondary circuit is completed to produce induced current. In this way, the secondary circuit is completed depending upon the contact between the tool and the workpiece, and an exciting current in the coil on the primary side is changed depending upon the change in electric current in the secondary circuit. Accordingly, the contact between the tool and the workpiece is detected by connecting the coil and a resistance in series and detecting the change in voltage across the resistance by a voltage detector.

In such an arrangement, the coil corresponds to a primary winding of a transformer, and the looped secondary circuit constitutes a secondary winding of one turn. The winding ratio of the secondary winding to the primary winding is very small, so that the change in the exciting current in the primary winding is very small, even if there is an ON-OFF change in the secondary circuit.

Furthermore, it is extremely difficult to produce a large induced current in the secondary circuit with light contact between a sharp edge of the tool and the workpiece, whereby it is difficult to improve the detecting sensitivity.

SUMMARY OF THE INVENTION

It is therefore the objects of the present invention to provide a new and improved contact detecting apparatus capable of detecting a light contact between a workpiece and a tool with a high detecting sensitivity.

Briefly, according to the present invention, these and other objects are achieved by providing a contact detecting apparatus in a machine tool including a machine body, a work table mounted on the machine body for mounting thereon a workpiece to be machined, a spindle head mounted on the machine body, a tool spindle rotatably supported in the spindle head for supporting a tool, and a control device for effecting relative movement between the work table and the tool spindle, as mentioned below. A magnetic coil is mounted on the periphery of the spindle head and connected to an AC power source for generating an induced current in a looped secondary circuit including the workpiece, work table, machine body, spindle head, tool spindle and tool, when the workpiece and the tool are moved relatively into contact with each other. A first conductive wire forming a secondary winding of one turn is arranged in parallel relationship with the looped secondary circuit and induced by energization of the magnetic coil. A second conductive wire is connected at one end thereof to the looped secondary circuit. A detecting device is connected to the first and second conductive wires for detecting contact between the workpiece and the tool.

BRIEF DESCRIPTION OF THE DRAWINGS

The foregoing and other objects and many of the attendant advantages of the present invention will be readily appreciated as the same become better understood by reference to the following detailed description, when considered in connection with the accompanying drawings, in which.

DETAILED DESCRIPTION OF THE PREFERRED EMBODIMENT

Figure 1:
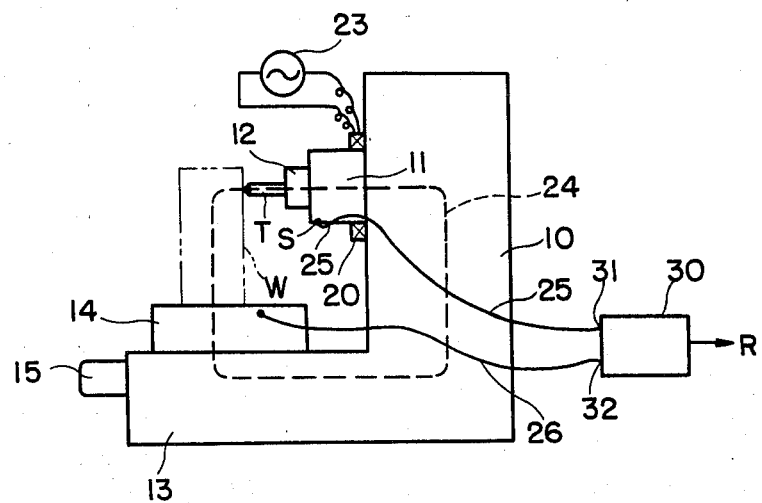
FIG. 1 is a schematic illustration of an arrangement of a contact detecting apparatus according to the present invention.

Referring now to the drawings, wherein like reference numerals or characters refer to identical or corresponding parts throughout the several views, and more particularly to FIG. 1, a workpiece W to be machined is mounted on a work table 14, which is, in turn, slidably mounted on a machine body 13. The work table 14 is moved by a drive motor 15 secured to the machine body 13 in a well known manner. A spindle head 11 is secured to an upstanding column 10 mounted on the machine body 13 and rotatably supports a spindle 12. The spindle 12 supports a tool T for a machining operation on the workpiece W.

Figure 2:
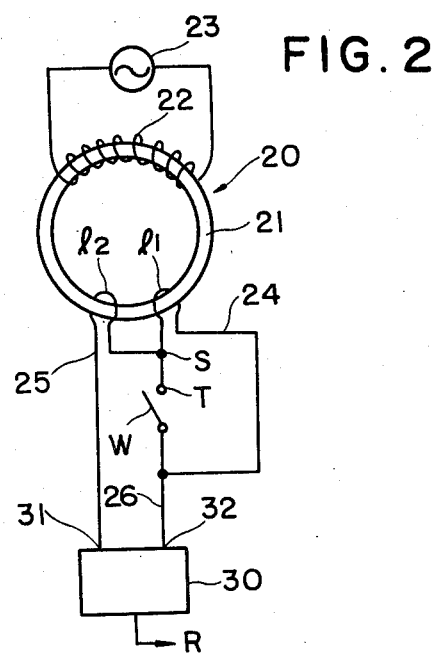
FIG. 2 is an electrical equivalent circuit diagram of the contact detecting apparatus shown in FIG. 1.

A magnetic coil 20 is secured to the spindle head 11 in such a manner as to surround the spindle head 11. As shown in FIG. 2, the magnetic coil 20 comprises an annular iron core 21 surrounding the spindle head 11 and a primary winding 22 wound around the iron core 21. The primary winding 22 is connected to an AC power source 23 to be energized therefrom so that the coil 20 generates loops to magnetic flux surrounding a part of an electric current path 24 constituting a first secondary winding l1 of one turn. The electric current path 24 is formed by tool T, spindle 12, spindle head 11, column 10, machine body 13, work table 14 and workpiece W. Accordingly, when the tool T contacts the workpiece W, an induced current is produced in the electric current path 24, whereby an electric potential difference between the tool T and the workpiece W becomes almost zero. On the other hand, when the tool T does not contact the workpiece W, no induced current is produced in the electric current path 24, whereby a predetermined electric potential difference is caused between the tool T and the workpiece W.

A conductive wire 25 forming a second secondary winding l2 of one turn is arranged in parallel relationship with the electric current path 24. One end of the conductive wire 25 passes through the magnetic coil 20 and is connected to the front end S of the spindle head 11. The other end of the conductive wire 25 is connected to an input terminal 31 of a detecting circuit 30. The other input terminal 32 of the detecting circuit 30 is connected by a conductive wire 26 to the work table 14. Accordingly, first and second secondary windings l1 and l2 are formed which are connected to each other at the front end S of the spindle head 11 with the same polarity, as shown in FIG. 2. Induced secondary current is produced in the first and second secondary windings 11 and 12 by exciting the primary winding 22 of the magnetic coil 20. Induced voltages appearing in the first and second secondary windings 11 and 12 are applied to the input terminals 31 and 32 of the detecting circuit 30 which generates a signal R when detecting a predetermined electric potential difference.

When the tool T does not contact the workpiece W, the electric current path 24 is opened, so that there is no induced current. Accordingly, electric potentials at the input terminals 31 and 32 relative to the common connecting point S are equal, whereby no signal is generated from the detecting circuit 30. On the other hand, when the tool T contacts the workpiece W, the electric current path 24 is closed, so that the electric potential of the work table 14 becomes substantially equal to that of the common connecting point S. Accordingly, the electric potential difference is caused between the input terminals 31 and 32 of the detecting circuit 30, which thus generates a contact detecting signal.

In this manner, since the electric potential difference between the first and second secondary windings 11 and 12 connected in parallel relationship with each other is detected, detecting sensitivity is improved even with a light contact between a sharp edge of the tool and the workpiece.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a machine tool including a machine body, a work table mounted on said machine body for mounting thereon a workpiece to be machined, a spindle head mounted on said machine body, a tool spindle rotatably supported in said spindle head for supporting a tool, and control means for effecting relative movement between said work table and said tool spindle, a contact detecting apparatus comprising:
    an AC power source;
    a magnetic coil mounted on the periphery of said spindle head and connected to said AC power source for generating an induced current in a looped secondary circuit including the workpiece, work table, machine body, spindle head, tool spindle and tool, when said workpiece and said tool are moved relatively into contact with each other, and for generating a potential between the tool and the workpiece when said tool and said workpiece are not in contact;
    a first conductive wire forming a secondary winding of one turn in parallel relationship with said looped secondary circuit and having a potential induced across said first conductive wire by energization of said magnetic coil;
    a second conductive wire connected at one end thereof to said looped secondary circuit; and
    detecting means connected to said first and second conductive wires for detecting contact between said workpiece and said tool based on the difference between the potential across said tool and said workpiece and the potential induced across said first conductive wire.

2. A contact detecting apparatus as set forth in claim 1, comprising:
    said first conductive wire having one end passing through said magnetic coil and connected to said spindle head.

3. A contact detecting apparatus as set forth in claim 2, comprising:
    said second conductive wire having one end connected to said work table.

4. A contact detecting apparatus as set forth in claim 1, wherein said detecting means comprises:
    a voltage detector connected between said first and second conductive wires.

* * * * *